(No Model.)

G. A. ROBERTS.
CONCAVE FOR THRASHING MACHINES.

No. 320,288. Patented June 16, 1885.

Attest:
John Schumann.
A. Barthel

Inventor:
George A. Roberts.
by his Att'y
Tho. S. Sprague

UNITED STATES PATENT OFFICE.

GEORGE A. ROBERTS, OF THREE RIVERS, MICHIGAN.

CONCAVE FOR THRASHING-MACHINES.

SPECIFICATION forming part of Letters Patent No. 320,288, dated June 16, 1885.

Application filed November 26, 1884. (No model.)

*To all whom it may concern:*

Be it known that I, GEORGE A. ROBERTS, of Three Rivers, in the county of St. Joseph and State of Michigan, have invented new and useful Improvements in Concaves for Thrashing-Machines; and I do hereby declare that the following is a full, clear, and exact description thereof, reference being had to the accompanying drawings, which form a part of this specification.

This invention relates to improvements in thrashing-machines; and it consists in the peculiar combinations and the construction and arrangement of parts hereinafter more fully described and claimed.

Figure 1:
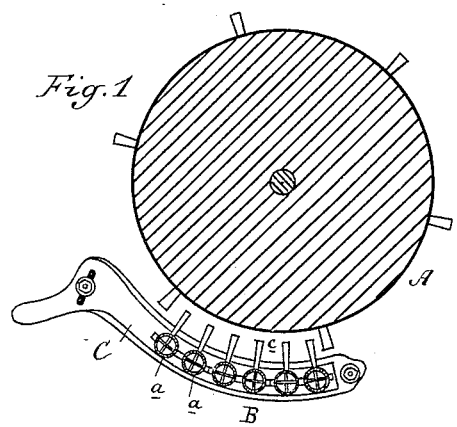
Figure 2:
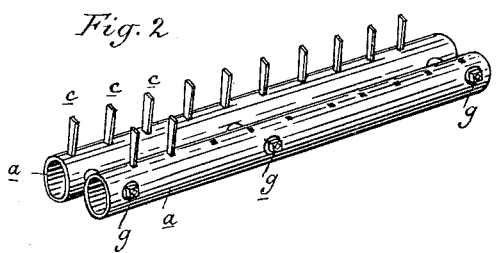
Figure 3:
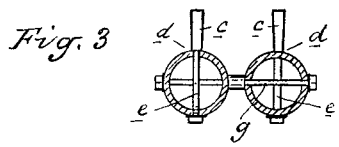

Figure 1 is an elevation showing the ends of a concave and its adjacent cylinder. Fig. 2 is an enlarged perspective detail of a section of the concave. Fig. 3 is a cross-section of the same.

In the accompanying drawings, which form a part of this specification, A represents the cylinder, and B the concave. This concave is composed of a series of tubular bars, $a$, each provided with perforations through two sides thereof, and these perforations through the one side are coincident with or opposite to those through the other side. $c$ are the teeth, each provided with a service projection, terminating in shoulders $d$, which are fashioned to fit to the contour of the tubular bar, below which is formed such a continuation of the shank $e$ as to fit in shape and size the coincident perforations in the tubular bars, and this shank is threaded on its free end to receive a nut, so that when inserted the shank will pass through these coincident perforations in the tubular bars, and by means of the nut be rigidly held in position. These tubular bars are arranged side by side, as shown in Fig. 1, in the heads C, there being one of the latter at each end of the tubular bars, and this head is curved to conform at least partially to the shape of the cylinder A. The tubular bars are secured together by a series of tension-bolts, $g$, passed through them, and in order to maintain suitable space between the tubular bars collars are interposed upon these connecting-bolts between the tubular bars, as shown in Figs. 1, 2, and 3. These interposing collars are fashioned so as to not only determine the space desired between each adjacent pair of tubular bars, but likewise to so firmly hold each tubular bar in its proper place that the space between the peripheries of each two tubular bars on a line with their tops is wider than it is half-way down, or where the bolts $g$ pass through said bars, thus forming above these bolts a hopper to receive the kernels of grain, and below said point a discharge-spout of inverse shape, facilitating a free discharge of such kernels. Supposing, now, the concave properly adjusted and the cylinder in motion in the operation of thrashing grain, it will readily be seen that by means of the hoppers thus formed, immediately following each point of contact with the concave teeth on the apex of each tubular bar, the result is that a large portion of the threshed grain disengaged from the heads of grain in each successive contact with the concave teeth is, by its own gravity and the centrifugal force acquired from the cylinder, projected into the hopper immediately following, and thence downward through the throat, finally lodging on the separating-pan below, and is by this means at once separated and removed from the main mass of the thrashed matter before the latter is discharged from the cylinder, to be then acted upon by the separating mechanism employed in the separating-chamber for the elimination of the grain therefrom, by means of the receiving-hoppers as formed by the use of the tubular bar and acted upon by the separating mechanism of the separating-chamber. A very great advantage is gained in thus greatly diminishing the work of separation required of the separating mechanism. It will also be seen that by this construction of the tubular bars, carrying the teeth arranged and secured as described, a much stronger concave is obtained than that of ordinary construction.

I am aware that the tubular bar is a specific feature of my application for a patent now before the Department for improvement in thrashing-cylinder, and that the advantages gained in the use of the tubular bar, as there set forth, are likewise found to be a specific feature of my present improvement in concave; yet it will also be noticed that the conditions under which it is now employed and made effective are directly the reverse of those when in use in the thrashing-cylinder, because, when the thrashing-cylinder and the concave are placed relatively in position and properly adjusted for thrashing purposes, the tubular bar in use in the cylinder, the service projection of the tooth is exerted when the bar is sustained in a position of convexity to its point of contact, whereas in the use of the tubular bar in the concave the service projection of tooth is exerted directly opposite to that of the cylinder, or when the bar is sustained in a position of concavity to the point of contact.

What I claim as my invention is—

A concave for thrashing-machines, comprising a series of hollow cylindrical bars, each carrying teeth on the apex or highest part of its surface, in combination with tension-bolts passing through the bars, and with intermediate collars interposed at the points of nearest approach between the adjacent bars, substantially as and for the purpose set forth.

GEORGE A. ROBERTS.

Witnesses:
D. J. FRENCH,
J. D. SALSIG.